United States Patent [19]

Johnson et al.

[11] Patent Number: 4,664,649

[45] Date of Patent: May 12, 1987

[54] METHOD AND APPARATUS FOR PRODUCING DRAWSTRING BAGS

[75] Inventors: James R. Johnson, Chamblee; Mark Hudgens, Smyrna, both of Ga.

[73] Assignee: AMI, Inc., Doraville, Ga.

[21] Appl. No.: 829,808

[22] Filed: Feb. 14, 1986

[51] Int. Cl.[4] ..................... F16H 7/20

[52] U.S. Cl. ..................... 493/197; 83/917; 156/497; 156/499; 493/202; 493/208; 493/209; 493/225; 493/232; 493/248

[58] Field of Search ............... 493/191, 192, 197, 202, 493/208, 209, 225, 232, 248, 11, 22, 370, 189, 194, 199, 203; 83/355, 365, 369, 917, 356.3, 671, 911; 156/499, 82, 200, 465, 497, 515

[56] References Cited

U.S. PATENT DOCUMENTS

| | | | |
|---|---|---|---|
| 2,519,201 | 8/1950 | Seidman | 83/371 |
| 2,698,046 | 12/1954 | Finke | 156/200 |
| 4,125,044 | 11/1978 | Carrigan et al. | 83/917 |
| 4,130,039 | 12/1978 | Heyden et al. | 83/355 |
| 4,304,615 | 12/1981 | Siegel | 156/580.2 |
| 4,308,087 | 12/1981 | Johnson | 493/192 |
| 4,318,768 | 3/1982 | Johnson | 156/495 |
| 4,397,204 | 8/1983 | Colombo | 83/371 |
| 4,498,939 | 2/1985 | Johnson | 156/499 |
| 4,597,750 | 7/1986 | Boyd et al. | 493/346 |

*Primary Examiner*—Frederick R. Schmidt
*Assistant Examiner*—Robert Showalter
*Attorney, Agent, or Firm*—James B. Middleton

[57] ABSTRACT

A method and apparatus for forming draw tape bags wherein the bag material moves continuously during the manufacture, except for the last step. A roll of folded web is provided, and the loose edges are turned inwardly to form upper hems for the bags. The web continues to move, and a cutter is actuated to move through a circle and engage the web to punch finger holes in the hem. The web is further carried to a tandem sealer, the web passing over a roll where heated air is directed at the area of the hem. A "Teflon" strip is placed between the hems to prevent sealing them together. The web continues to a second sealing roll where the opposite side is sealed in the same way. The final step utilizes a stop-start apparatus with a side sealing blade. The side sealing blade has one radius for the body of the bag, and a larger radius for the hemmed area.

12 Claims, 13 Drawing Figures

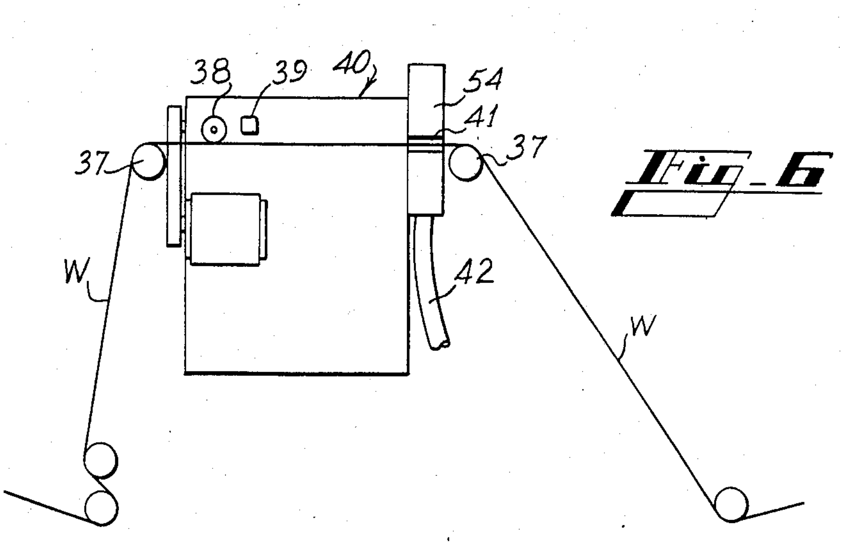
Fig. 6
Fig. 7
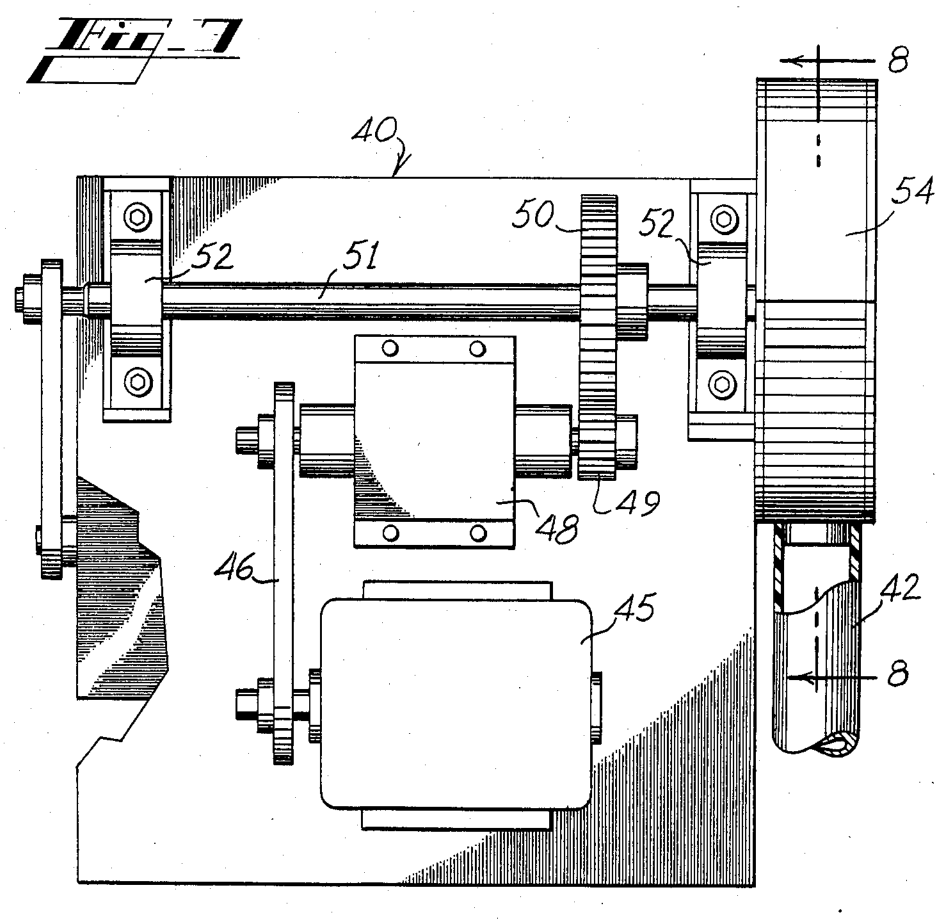

METHOD AND APPARATUS FOR PRODUCING DRAWSTRING BAGS

INFORMATION DISCLOSURE STATEMENT

Drawstring bags have long been utilized, and have taken many forms in the past. While drawstring bags made of plastic have been utilized to some extent, such bags have been used mostly in the boutique bag, which tends to be a more expensive bag. Much of the reason for this limitation in the market area is the cost of producing a drawstring bag. The usual plastic drawstring bag requires several special steps because a string is normally used, and the string must be knotted, provided with a metal fastener, or otherwise fixed together. These processes cannot be carried out by the usual bag producing equipment.

More recently, there have been draw tape bags utilized, again, mostly in the boutique bag area. The draw tape bags represent a major advance in that a thermoplastic bag is provided with a thermoplastic tape so the tape can be heat sealed into the bag during the process of manufacture of the bag.

There are still numerous difficulties in the production of the draw tape bags. In the making of a draw tape bag, sheet material is generally purchased in rolls, and the roll is unwound, then an edge is turned in a hemming operation. After this point, the conventional machinery requires that the sheet material being fed be stopped for each operation, then restarted. Thus, the material must be stopped while a hole is punched, then the tape must be inserted following the hole punching operation. In conjunction with the tape insertion, of course there is the unwinding and splicing of the tape itself so a machine must handle two webs instaed of only one. Next, the hem must be sealed, and both sides of the bag must have the hem sealed so that two sets of sealing bars are normally required. Finally, the individual bags are side sealed and separated from the continuous piece of material. The completed bag can then be removed for further processing.

One of the major difficulties in the conventional bag forming apparatus is in the requirement to stop and start the web because most of the equipment is of a reciprocating nature. As the processing line becomes longer, it will be obvious that the quantity of sheet material in the line is longer, and has a greater inertia. As the web is more and more difficult to stop and start, timing becomes more difficult and there is greater chance for error in all parts of the machinery.

SUMMARY OF THE INVENTION

The present invention relates generally to a method and apparatus for producing draw tape bags, and is more particularly concerned with a method and apparatus wherein more of the processing is handled in a continuous movement of the web, with only the final steps requiring the stopping and starting of the web.

The present invention provides a unique hemming arrangement, and means for punching holes in the hemmed edge while the web is continuously moving. The draw tape is inserted also while the web moves continuously, and the hem is sealed while the two sides of the bag are substantially contiguous, using heated air so the sealing is continuous. A barrier is placed between the two sides of the bag to assure that the bag is not sealed closed, and the barrier may be a floating barrier stationary with respect to the machine frame, or a continuously moving barrier that remains stationary with respect to the film. In the final steps, the web is pulled taut laterally, and a side sealing blade is used to side seal the bag in both the body area and the hemmed area, and to sever the individual bags.

BRIEF DESCRIPTION OF THE DRAWINGS

These and other features and advantages of the present invention will become apparent from consideration of the following specification when taken in conjunction with the accompanying drawings in which:

FIG. 6 is an elevational view taken substantially along the line 6—6 in FIG. 1;

FIG. 7 is an enlarged elevational view taken from the opposite side of the apparatus shown in FIG. 6;

DETAILED DESCRIPTION OF THE EMBODIMENT

Figure 1:
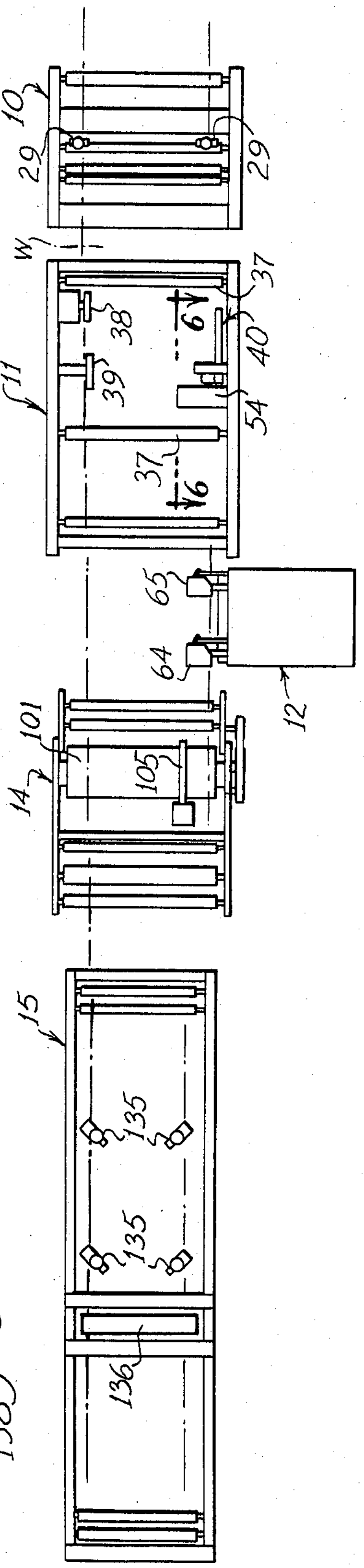
FIG. 1 is a somewhat schematic, top plan view showing bag forming apparatus made in accordance with the present invention.

Referring now more particularly to the drawings, and to that embodiment of the invention here presented by way of illustration, FIG. 1 shows the entire bag producing line. There would be an unwinding apparatus which is not here shown, and a hemming station designated generally at 10, followed by the hole punching station 11. The draw tape is then inserted by the apparatus designated generally at 12, and the hems are sealed by the tandem sealer 14. It is important to note that the sheet material moves continuously during all the processing through the tandem sealer 14. Only after the sealer 14 does the sheet material enter the stop-start portion of the machine designated at 15. The stop-start portion 15 will include a side sealing arrangement to complete the bags, and the bags will be delivered from the lefthand end of the apparatus as viewed in FIG. 1.

Figure 3:
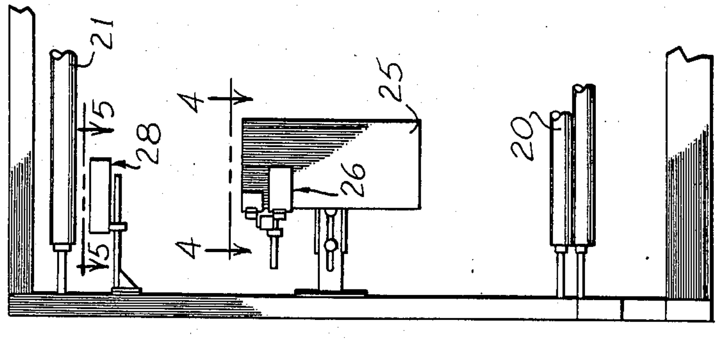
FIG. 3 is an elevational view taken from the right as viewed in FIG. 2, and showing the hemming apparatus.
Figure 2:
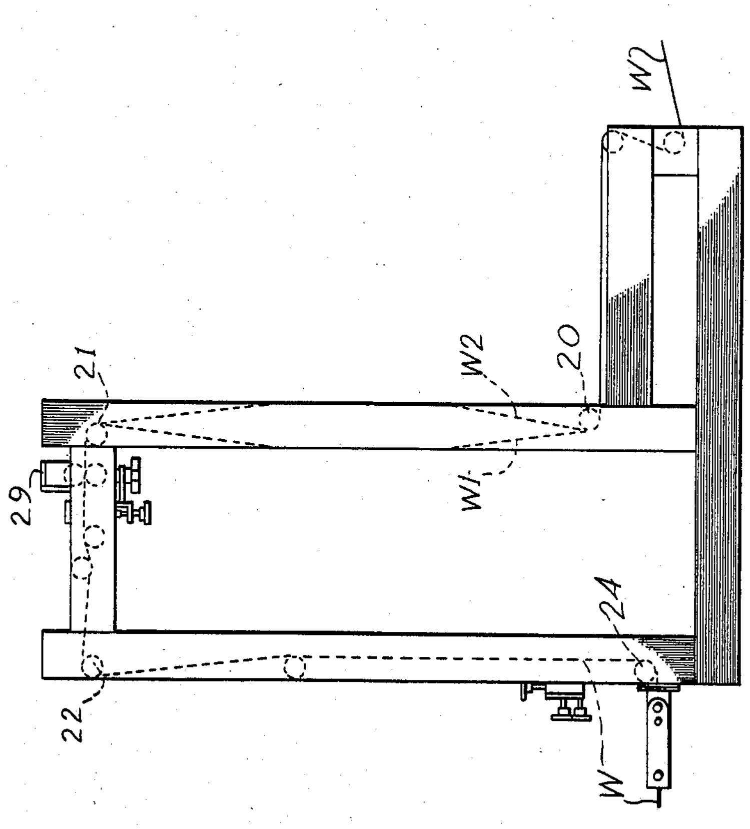
FIG. 2 is a somewhat enlarged side elevational view of the hemming apparatus made in accordance with the present invention.

Attention is next directed to FIGS. 2 and 3 of the drawings which show the means for hemming the upper edge of the bags.

In FIG. 2, the conventional folded web enters the apparatus from the right as viewed in FIG. 2, the web being designated at W. Those skilled in the art will understand that a conventional unwinding apparatus may be used, or other means may be utilized to provide the web W. It will also be understood by those skilled in the art that a converter normally buys a roll of plastic sheet material that is folded so the longitudinal fold line serves as the bottom of the bag. The top, or loose edges of the sheet material, are hemmed or otherwise treated to produce the desired bag, and lateral seals across the folded material separate the individual bags from one another. It is this form of material that is designated at W in FIG. 2. Thus, it should be seen that the web W passes over a roll 20, and the loose edges of the web are separated as indicated in broken lines at W1 and W2. The two edges of the web are hemmed, or folded inwardly, then reunited at the upper roll 21. At the roll 21, the web extends horizontally to a roll 22 which redirects the web downwardly to a roll 24 so the web extends towards the left for the next processing step.

Looking at FIG. 3 of the drawings, the apparatus for providing the hem in the web is illustrated. The web first passes over a plate 25, a loose edge of the web being folded around the plate 25 and held by a pad assembly 26. This first hemming assembly provides the basic hem; then, the pressing assembly designated at 28 creases the sheet material to complete the hemming operation. Immediately after the pressing assembly 28, the hemmed web passes onto the roll 21, then through rolls 29.

The rolls 29 comprise relatively short rollers on opposite sides of the web which are urged together to clamp the web. The center line, or axis of rotation, of the rolls 29 is angled with respect to the direction of travel of the sheet material so there are forces tending to stretch the sheet material laterally. This arrangement therefore serves to straighten the material and prevent wrinkles in the material. These straightening rolls are disclosed in the prior patent of James R. Johnson, U.S. Pat. No. 4,498,939, and no further description should be required.

Figure 4:
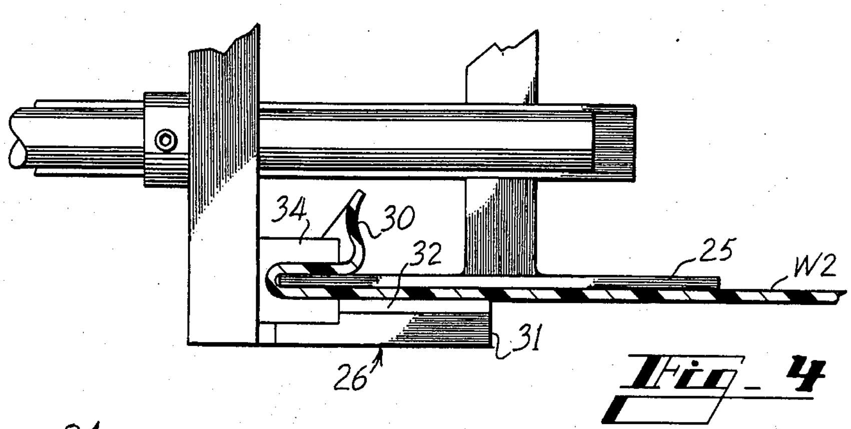
FIG. 4 is an enlarged fragmentary view taken substantially along the line 4—4 in FIG. 3 and showing the first step in turning a hem.

FIG. 4 of the drawings is an enlarged top plan view showing the first hemming assembly including the plate 25 and the pad assembly 26. It will here be seen that the web W is against the plate 25, the web being folded around the plate as indicated at 30. The pad assembly 26 includes a pressure pad 31 having an inner surface 32 of felt or the like. The purpose of the pad 31 is to urge the web W firmly against the plate 25 to prevent undesirable motions of the web as it is hemmed. Simultaneously, there is an edge holding member 34 that extends around the edge of the plate 25 to hold the hem portion 30 of the web in position on the plate 25.

It must be remembered that the web W is moving through the path best shown in FIGS. 2 and 3, so the arrangement shown in FIG. 4 guides the film as the hem is initially turned, assuring that the web is properly fed to the pressing assembly 28.

Figure 5:
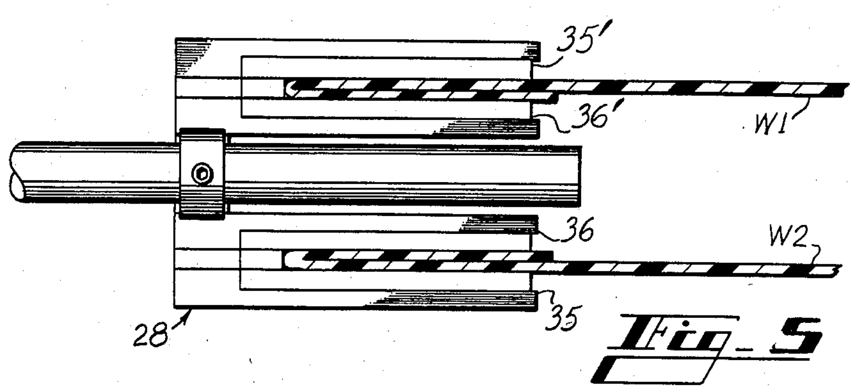
FIG. 5 is an enlarged view taken substantially along the line 5—5 in FIG. 3 and showing the second step in completing the turning of the hem.

The pressing assembly 28 is shown in FIG. 5 and includes opposed pads 35 and 36 having inner surfaces of felt or the like. Here it will be seen that there is no spacer to hold the hem open, so pressure of the pads 35 and 36 will tend to crease the material and cause the hem to remain in place. It will also be noted that there are two of the creasing assemblies, one for each side of the web, or of the bag material. The opposite members are designated with the primes of the same numbers.

Returning briefly to FIG. 1 of the drawings, it will be seen that the hole punching station 11 follows the hemming assembly 10. The web W enters the punching station at the right as viewed in FIG. 1, and it will be seen that there are measuring, or detection, means shown schematically at 38 and 39. The measuring means 38 is of a type well known in the art, and includes a wheel that rolls on the web as the web moves. Rotation of the wheel generates electrical signals at predetermined times so the device can be used to measure lengths of sheet material. In the present apparatus, the measuring device 38 can be used to measure the predetermined width of the bag in order to provide a signal to the punching apparatus to punch at the appropriate location.

It is common in the production of printed bags to utilize printed material to indicate the appropriate bag widths. For this technique, the sensing means 39 will be utilized in the present invention. The sensing means 39 is well known to those skilled in the art and includes a single unit including a light source and a light responsive means so that an electrical signal can be generated on reading certain printed material. In the present invention, a signal from the sensing means will be utilized to actuate the punching means.

Figure 8:
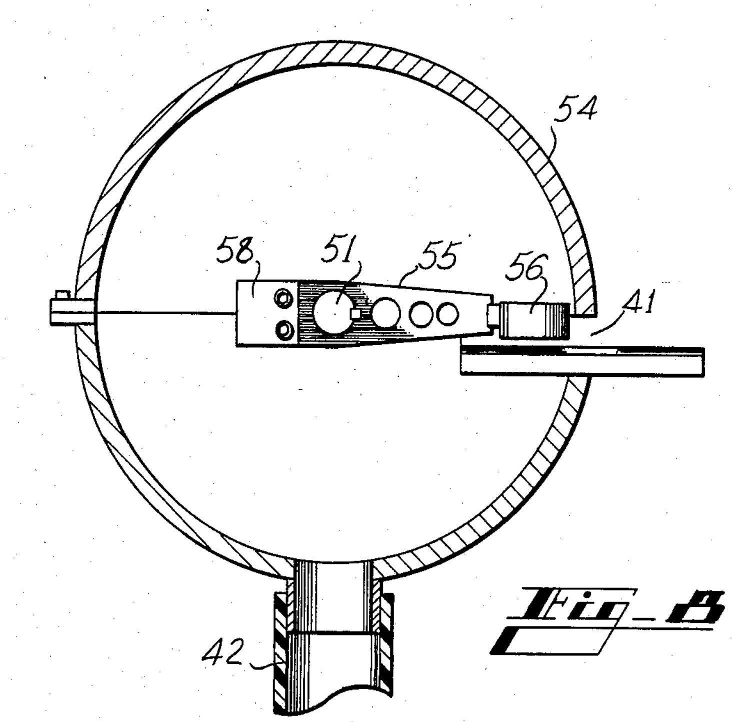
FIG. 8 is a cross-sectional view taken substantially along the line 8—8 in FIG. 7.

The punching means is indicated generally at 40 and is shown in more detail in FIGS. 6, 7 and 8. Looking at FIG. 6, it will be seen that the hemmed web W enters the punching station, and the wheel 38 is indicated as engaging the web, and the sensing means 39 is indicated as being closely adjacent for reading printed material thereon. The web continues across the punching station 40, held on guide rollers 37, and passes through a slot 41. A cutter cuts a hole at the desired time as the web passes through the slot 41, and scrap is discharged through the pipe 42.

In FIG. 7 it will be seen that there is a drive motor 45 having a belt 46 connecting the motor 45 to an electrically operated clutch and brake apparatus 48. The output of the clutch assembly 48 includes a gear 49 that meshes with a gear 50 on the cutter drive shaft 51. The shaft 51 is appropriately journaled in bearings 52 and mounts a cutter arm at its end which extends into the cutter housing 54. It should therefore be understood by those skilled in the art that, during operation of the apparatus, the electric motor 45 will be running continuously to drive one side of the clutch and brake mechanism 48. When a hole is to be cut in the moving web, an electrical signal will be provided to the clutch and brake assembly 48 so the output will be connected to the input and cause rotation of the gear 49. Rotation of the gear 49 will cause rotation of the gear 50, hence the shaft 51, to cause a cutting stroke of the cutter.

With the above in mind, attention is directed to FIG. 8 of the drawings which shows the interior of the cutter housing 54. It will be seen that the cutter includes an arm 55 carrying a cutter 56 at one end and weights 58 at the opposite end. With the arrangement shown, it should be well understood that the web will pass through the slot 41 with the hemmed edge of the web extending beneath the cutter 56.

While the cutter 56 is here shown in position immediately prior to making a cut through the web, it should be understood that the arm 55 will normally assume a position approximately 45° clockwise from the position shown. Thus, the "rest" position of the arm 55 will place the cutter below the web; then, when a punch cycle starts, the arm 55 will be rotated clockwise as viewed in FIG. 8 to make one complete circle. The arm will therefore move quite rapidly, and the cutter 56 will be moving very rapidly when it engages the web in the slot 41. Because of the speed of motion of the cutter 56, and the somewhat limited height of the cutter 56, it will be understood that there is no substantial motion of the web with respect to the cutter 56 while the cutter 56 is in the plane of the web. Rather, the cutter passes very quickly through the web, carries the scrap to a point below the web so the scrap can be discharged through the pipe 42. The arm is braked by the clutch and brake 48 to be ready for the next cycle.

Figure 9:
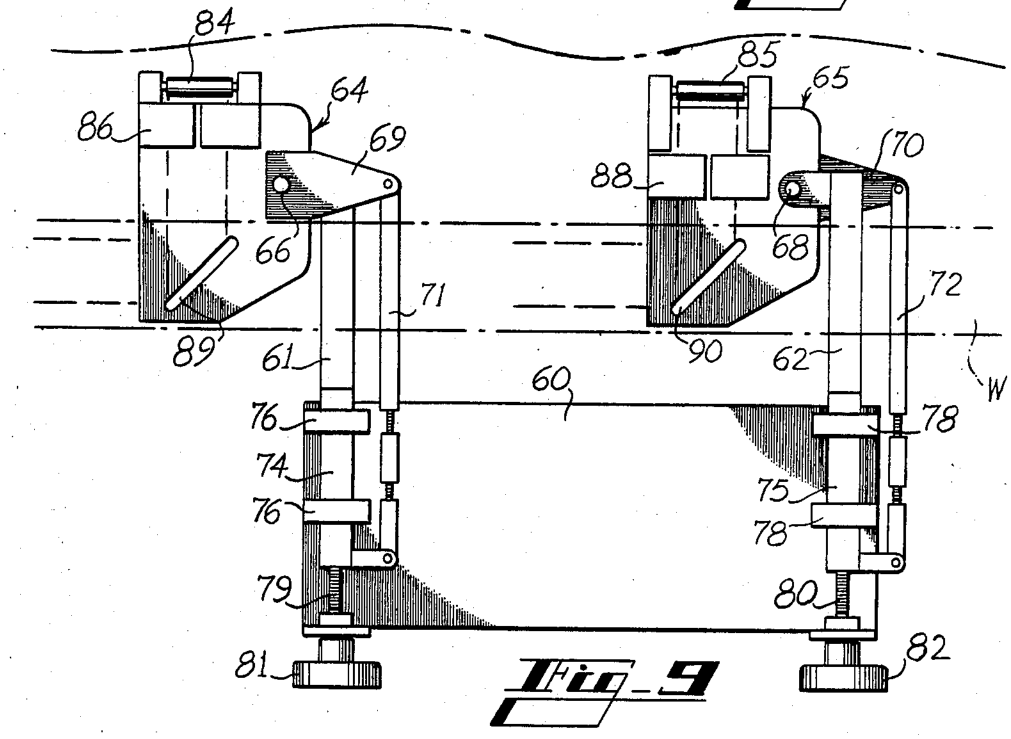
FIG. 9 is an enlarged top plan view showing tape inserting apparatus.

Referring again to FIG. 1, it will be seen that, after the punching station 11, the next step is the tape insertion at 12. The tape insertion apparatus is shown in FIG. 9. It will be understood by those skilled in the art that tape for the draw tape bags is provided in rolls, and is unwound and fed to the bag making apparatus. Turning plates are conventionally provided to guide the tape into the bag and beneath the hem. The apparatus shown in FIG. 9 comprises an improved assembly for receiving tape and directing the tape into the hem.

Looking at FIG. 9 in more detail, it will be seen that there is a mounting plate 60 having a pair of arms 61 and 62 fixed to the plate 60 and extending towards the web. At the extending ends of the arms 61 and 62, there are turning plates generally designated at 64 and 65. It will be understood that one turning plate, for example the turning plate 64, will direct a tape to the upper hem while the other turning plate 65 will direct tape to the lower hem. To achieve this result, it will be seen that the turning plate assembly 64 is mounted above the arm 61 while the turning plate assembly 65 is mounted below the arm 62. This small difference in mounting arrangement is sufficient to space the turning plates 64 and 65 sufficiently to allow the plate 64 to direct tape to the upper side and the plate 65 to direct tape to the lower side of the web.

It will also be seen that the turning plates 64 and 65 are pivotally mounted at pivot points 66 and 68. The arms 69 and 70 extend to the right as is shown in FIG. 9, and are connected to control links 71 and 72. Thus, motion of the control links 71 and 72 will cause motion of the arms 69 and 70 to cause the turning plates 64 and 65 to rotate about the pivot points 66 and 68.

To move the links 71 and 72, there are slide blocks 74 and 75 mounted on the upper surface of the base plate 60. The slide blocks 74 and 75 are appropriately held by bearing members 76 and 78; and, screws 79 and 80 are arranged to cause reciprocal motion of the slide blocks 74 and 75.

It will now be seen that rotation of the knobs 81 and 82 will rotate the screws 79 and 80 to cause linear motion of the slide blocks 74 and 75. The links 71 and 72 are appropriately connected to the slide blocks 74 and 75 so that motion of the slide blocks will cause motion of the links, and consequent rotation of the turning plates 64 and 65.

It will be remembered that the turning plates 64 and 65 are disposed between the two layers of the bag material. As a result, a tape must pass substantially parallel to the turning plates 64 and 65 to be between the two sides, then make a 360° turn to be returned to the area of the hem. It will be seen that the turning plates 64 and 65 have rollers 84 and 85 to allow this bend of the tape. Hold down guides 86 and 88 then guide the tape to the turning slots 89 and 90. Since the slots 89 and 90 are at substantially 45° with respect to the rollers 84, it will be understood that a tape passing through the slot and extending to the left as viewed in FIG. 9 will pass parallel to the motion of the web.

Figure 11:
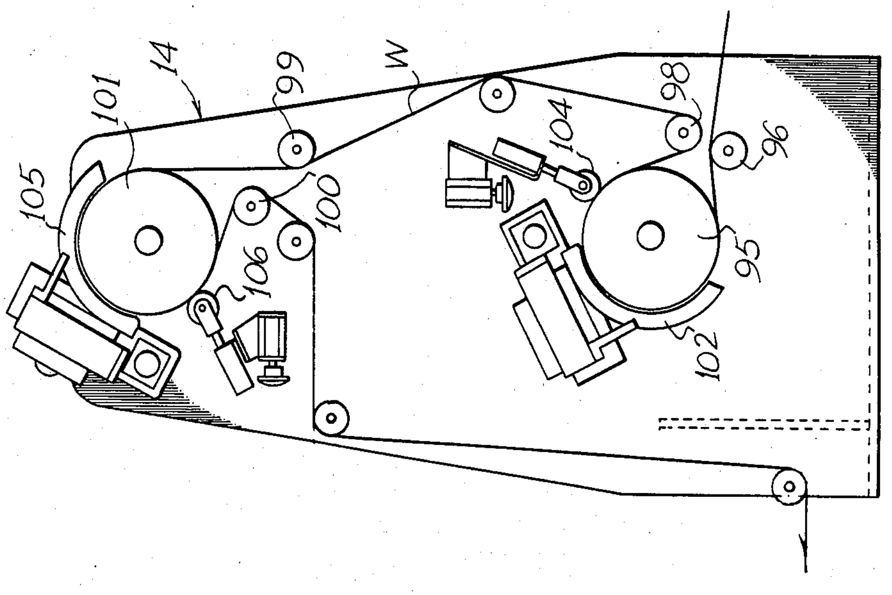
FIG. 11 is a view of the hem sealer shown in FIG. 10 with the front cover removed to show the interior construction.
Figure 10:
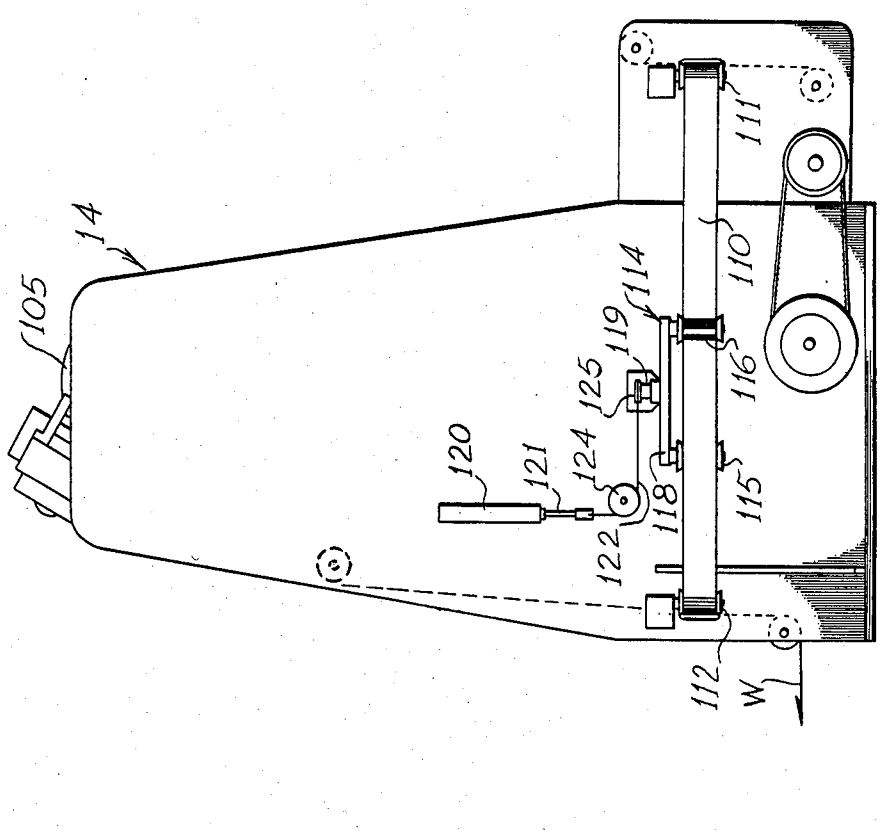
FIG. 10 is a side elevational view of the hem sealer and showing the continuous, movable barrier.

With the tape now inserted into the hem, the next step is to seal the hem to the side of the bag, and the tandem sealer 14 handles this step. The tandem sealer is shown in FIGS. 10 and 11 of the drawings. In FIG. 11, it will be seen that the web enters the sealer close to the bottom of the sealer, where there is a first sealing roll 95. The web passes substantially completely around the sealing roll 95, and is held in that condition by idler rolls 96 and 98. The web then passes upwardly where guide rolls 99 and 100 hold the web around most of the circumference of a second sealing roll 101. The web is then guided out of the sealing apparatus.

The use of hot air sealers is known in the art, and the particular form of sealer here used is disclosed in patents of James R. Johnson, U.S. Pat. Nos. 4,498,939, 4,318,768 and 4,308,087. Briefly, the hot air sealer includes a curved manifold 102 that extends around an arc of the sealing roll 95 closely adjacent thereto. As the web passes between the manifold 102 and the roll 95, heated air is blown onto the web and heats the web sufficiently to cause sealing. This technique will be sufficiently understood by those skilled in the art from a review of the cited patents.

In the present application apparatus, following the application of heated air through the manifold 102, there is a wheel 104 that is precisely aligned with the heated area of web. This wheel 104 therefore presses down the thermoplastic material while the material is quite hot, thereby assuring a complete and smooth weld for the hem.

It will be understood from observation of FIG. 11 that the heated air from the manifold 102 engages one side of the web, namely the bottom as the web has been moving; and, the web is reversed by passing around the sealing roll 95 so that the manifold 105 heats the opposite side, or top, of the web. As before, the web is heated as it passes around the sealing roll 101, and a wheel 106 presses the heated area to assure a complete and smooth seal.

It will be readily realized by those skilled in the art that, in heating thermoplastic material as shown in FIG. 11, there will be a tendency to seal all layers together, which would seal the bag closed. While this can be prevented somewhat through proper application of heated air as is taught by the above cited prior patents, it is preferable to assure that the bags will not be sealed closed by placing a barrier in the bag opening, or between the layers of the web.

One means for placing a barrier in the web is illustrated in FIG. 10 of the drawings. Looking at FIG. 10 in conjunction with FIG. 11, it will be seen that the barrier includes a strip, or band, having sufficient width to cover the area heated by the manifolds 102 and 105. This strip is indicated at 110 in FIG. 10, and it will be seen that the barrier 110 passes around a roller 111 to be directed towards the incoming web. Though not here shown, a conventional turning plate will then be used to place the barrier 110 between the two hems in the web material so the barrier 110 will travel with the web as the web passes around the sealing roll 95 and the sealing roll 101. After the web has passed around the sealing rolls, the web is directed downwardly, and a turning plate will be utilized to direct the barrier 110 outwardly around the roller 112. The barrier 110 then passes to the roller 111 and through the same circuit.

It must be understood that bags made in accordance with the present invention should look attractive as well as be properly formed and sealed. Though the use of a barrier 110 will prevent sealing the bags closed, it is also important to maintain the barrier 110 in some tension to prevent wrinkling of the barrier and consequent wrinkling of the bag material. To achieve the constant tension of the barrier 110, there is a tensioning means 114 having a pair of rollers 115 and 116 on opposite sides of the barrier 110. The rollers 115 and 116 are mounted from an arm 118 which is pivotally mounted at 119.

There is a fluid operated cylinder 120 having a piston rod 121. A cable 122 is fixed to the piston rod 121, passes over a pulley 124 and engages a pulley 125 that is fixed to the arm 118. As a result, it will be seen that, when the piston rod 121 is caused to retract, or is urged towards retraction, the cable 122 will be pulled to cause rotation of the pulley 125 and consequent rotation of the arm 118. Thus, if the barrier 110 is quite lack, there will be definite rotation of the arm 118 until the rollers 115 and 116 firmly engage the barrier 110 and take up all slack. At this point, constant pressure on the cylinder 120 will maintain tension on the arm 118 to keep the barrier 110 under tension.

It will be obvious that the material of the barrier 110 must be such that it will not be affected by the temperatures involved, and will not adhere readily to the thermoplastic film. While various materials may be utilized, it has been found that fabric impregnated with "Teflon" (polytetrafluoroethylene) works quite well, the "Teflon" being able to withstand the temperatures and having little affinity for sticking to the polyethylene or similar films.

Figure 12:
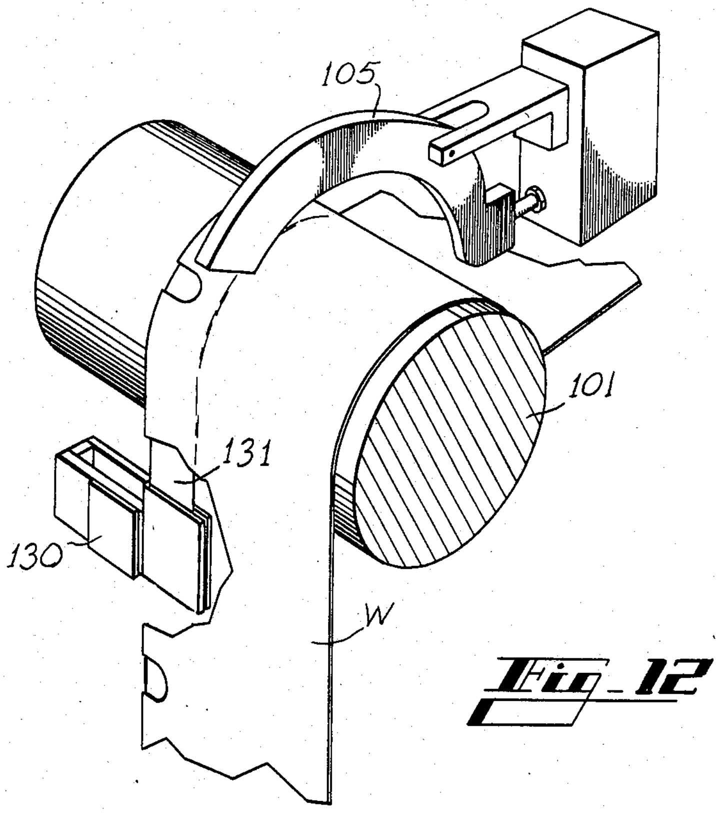
FIG. 12 is a detailed perspective view showing the upper sealer and illustrating the floating barrier; and, FIG. 13 is an enlarged, fragmentary cross-sectional view showing the improved side sealing blade.

While the continuously moving barrier illustrated in FIG. 10 is preferred in the apparatus of the present invention, another means for utilizing the barrier is shown in FIG. 12. While the arrangement shown in FIG. 12 may not operate quite as well, it does work satisfactorily, and is much simpler in construction.

Looking at FIG. 12 of the drawings, it will be seen that the upper sealing roll 101 is shown fragmentarily, with the web W passing thereover. As illustrated, the manifold 105 is slightly removed from the sealing roll 101, and many parts are omitted for clarity.

The barrier shown in FIG. 12 is stationary with respect to the frame of the machine, and floats between the hems of the bag material. Thus, a bracket 130 is fixed to the machine frame, and carries at its extending end a barrier 131. As before, the barrier 131 will comprise a strip of Teflon tape or the like, the barrier 131 being held firmly by the bracket 130, and extending around the sealing roll 101. Thus, the operation of the barrier 131 is precisely the same as the operation of the barrier 110, but the barrier 131 is stationary with respect to the machine frame and the material slides over the barrier, while the barrier 110 moves with respect to the machine frame and moves with the web.

As the web leaves the tandem sealing station 14, the web now enters the stop-start portion of the machine. This portion of the machine is mostly conventional; however, it has been found that rollers 135 should be added to maintain the web wrinkle-free. The rollers 135 are here shown as placed in two sets, and are constructed precisely the same as the rolls 29 previously discussed. It will therefore be understood that the rolls 135 cause a lateral tension on the web so the web is held flat up to the time the web is engaged by the side sealing blade indicated schematically at 136.

Those skilled in the art will realize that the side sealing blade 136 provides a seal across the web both to seal the side of the bag, and to separate each bag from the web. It should further be realized that, in the draw tape bag, the side sealing blade is required to seal the body of the bag which is only two layers and the draw tape area of the bag which is six layers. The problem is made more difficult by the fact that four layers in the draw tape area are the same as the bag material while the tape itself may be a different material. The commonly used draw tape bag has a body made of low density polyethylene (LDPE), or a linear low density polyethylene (LLDPE) which will usually be thinner than LDPE; then, the draw tape is made of high density polyethylene (HDPE), and perhaps a coextrusion with other materials.

Because of the above noted differences, the conventional side sealing blade tends either to fail to seal the draw tape area, or to damage the body area of the bag. The blade of the present invention resolves the difficulties and achieves good sealing completely across the bag.

It should first be understood that the side sealing blade is a heated blade having a cutting edge, or sealing edge, that is formed as a small radius. From this it will be realized that a wider strip will be heated with a large radius and a narrower strip will be heated with a small radius. Further, a very thin blade will be quickly drained of heat on contact with material, while a heavier body will retain a greater quantity of heat.

Figure 13:
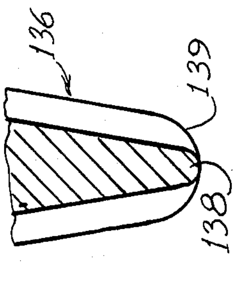

Looking now at FIG. 13 of the drawings, it will be seen that the blade 136 has one radius for the portion 138 of the blade that extends across the body of the bag. The portion 138 is such that the body, with its two layers, will be well sealed, but there will be no degradation of the plastic material.

The larger portion 139 of the blade 136 extends only across the hemmed area of the bag. Simply with the hems, there are four layers, and the tape makes six. Thus, the heavier body of the blade provides a greater quantity of heat for achieving a good seal. Also, the larger radius welds a wider strip to help assure that the tape is adequately caught in the sealed edge.

While the specific dimensions of the side sealing blade 136 are variable depending on the speed of the machine, the particular plastics used and the like, it has been found that a generally acceptable commercial side sealing blade can have a body portion with a radius of about one sixty-fourth inch, and a hem portion with a radius of about three sixty-fourths inch.

It will therefore be seen that the method and apparatus of the present invention provides a draw tape bag apparatus wherein the web moves continuously through the hem turning apparatus, through the punching, tape insertion and hem sealing. Only after the bag is completely formed except for the side seals does the material enter the stop-start portion of the machine. This results in a high production facility that produces excellent quality bags. Additionally, the apparatus is considerably easier to maintain than conventional reciprocating mechanisms.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

We claim:

1. Apparatus for producing a draw tape bag, wherein said bag is formed of a folded sheet of thermoplastic including a first side having a first hem at the upper edge thereof and a second side having a second hem in the upper edge thereof, and wherein said tape is formed of thermoplastic and is received within said first hem and said second hem, and a finger hole is provided in each of said hems, said apparatus comprising means for providing a continuous web of said folded sheet of thermoplastic and means for continuously moving said web along a path, hemming means disposed along said path for continuously folding the loose edges of said folded sheet inwardly to lie between said first side and said second side, punching means disposed after said hemming means on said path for punching said finger holes in said upper edges while said folded material is continuously moving, means for inserting a continuous length of said tape into said hem so that said tape moves with said folded material, first continuous sealing means disposed along said path at said upper edge of said material for heat sealing the hem on a first side of said bag, second continuous sealing means disposed along said path after said first continuous sealing means at said upper edge of said material for heat sealing said hem on the second side of said bag, a barrier strip within said bag disposed between said hems through said first and second sealing means, and side sealing means for side sealing said bags and separating said bags from said web, said hemming means including a first hemming assembly for turning the raw edge of said folded sheet to form a hem, and a second hemming assembly for creasing the material, said first hemming assembly comprising a plate disposed in said path for receiving said raw edge therearound, and pad means for retaining said web in alignment with said plate, said second hemming assembly including pressing means for creasing said folded sheet.

2. Apparatus for producing a draw tape bag, wherein said bag is formed of a folded sheet of thermoplastic including a first side having a first hem at the upper edge thereof and a second side having a scond hem in the upper edge thereof, and wherein said tape is formed of thermoplastic and is received within said first hem and said second hem, and a finger hole is provided in each of said hems, said apparatus comprising means for providing a continuous web of said folded sheet of thermoplastic and means for continuously moving said web along a path, hemming means disposed along said path for continuously folding the loose edges of said folded sheet inwardly to lie between said first side and said second side, punching means disposed after said hemming means on said path for punching said finger holes in said upper edges while said folded material is continuously moving, means for inserting a continuous length of said tape into said hem so that said tape moves with said folded material, first continuous sealing means disposed along said path at said upper edge of said material for heat sealing the hem on a first side of said bag, second continuous sealing means disposed along said path after said first continuous sealing means at said upper edge of said material for heat sealing said hem on the second side of said bag, a barrier strip within said bag disposed between said hems through said first and second sealing means, and side sealing means for side sealing said bags and separating said bags from said web, said first sealing means including a first sealing roll for receiving said web therearound, a first manifold closely adjacent to an arc of said first sealing roll for directing heated fluid against said web, and a barrier strip extending through said arc between said hems of said folded sheet.

3. Apparatus as claimed in claim 2, said second sealing means including a second sealing roll for receiving said web therearound, a second manifold closely adjacent to an arc of said second sealing roll for directing heated fluid against said web, and a barrier strip extending through said arc between said hems of said folded sheet.

4. Apparatus as claimed in claim 3, and including means for holding said barrier strip while said web moves past said barrier strip.

5. Apparatus as claimed in claim 3, said barrier strip comprising a continuous length of material received between said hems and movable therewith, and tensioning means for maintaining said barrier strip in tension.

6. Apparatus as claimed in claim 3, said side sealing means comprising a heated blade having a sealing edge, said sealing edge including a body portion for sealing the body of a bag, and a hem portion for sealing the hem portion of a bag, said body portion having a first radius and said hem portion having a second radius, said second radius being greater than said first radius.

7. A method for producing a draw tape bag, wherein said bag is formed of a folded sheet of thermoplastic including a first side having a first hem at the upper edge thereof and a second side having a second hem at the upper edge thereof, and wherein said tape is formed of thermoplastic and is received within said first hem and said second hem, and a finger hole is provided in each of said hems for allowing one to grasp said tape, said method including the steps of providing a continuous web of sheet material folded along its length to constitute bag material, said bag material having loose edges opposite the folded edge, continuously moving said web while turning said loose edges inwardly for forming said first hem and said second hem, directing the continuously moving web to a punching station, continuing to move said web while passing a punch through said hems for providing said finger hole, said punch being successively actuated for providing a finger hole in each bag to be formed from said web, directing heated fluid againt one side of said web in the area of said first hem for sealing said first hem, directing heated fluid against the other side of said web in the area of said second hem for sealing said second hem, and placing a barrier between said hems during the steps of directing heated fluid against said web.

8. A method as claimed in claim 7, said step of placing a barrier between said hems including the steps of inserting a continuous strip between said hems, allowing said strip to remain between said hems while said hems are sealed and moving said strip with said web, removing said strip from between said hems, and maintaining said strip in tension.

9. A method as claimed in claim 7, said step of placing a barrier between said hems including the steps of placing a strip of material between said hems, and holding said strip while said web passes thereover.

10. A hem sealer for thermoplastic bags, wherein a continuous web of material is formed into bags with hemmed upper edges, said hemmed edges are sealed, and said bags are subsequently side sealed and separated from said continuous web, said hem sealer including a first sealing roll for receiving said web therearound with a first side of said web outwardly, a barrier strip receivable between said hems for preventing sealing together of said hems, a first manifold for directing heated fluid against said web at one of said hems for sealing said hem, a second sealing roll for receiving said web therearound with a second side of said web outwardly, a barrier strip receivable between said hems for preventing sealing together of said hems, a second manifold for directing heated fluid against said web at the other of said hems for sealing said hem.

11. A hem sealer as claimed in claim 10, said barrier strip being a continuous strip passing around both said first sealing roll and said second sealing roll, and further including means for tensioning said barrier strip.

12. A hem sealer as claimed in claim 10, said barrier strip including a first strip held adjacent to said first sealing roll and a second strip held adjacent to said second sealing roll.

* * * * *